(12) United States Patent
Davis et al.

(10) Patent No.: US 11,219,205 B2
(45) Date of Patent: Jan. 11, 2022

(54) FOLDING FEATHER DECOY

(71) Applicant: Flint Holdings LLC, Hummelstown, PA (US)

(72) Inventors: Carroll J. Davis, Edgefield, SC (US); Jerry McPherson, Colstrip, MT (US); William Thomas Wiley, Starkville, MS (US)

(73) Assignee: Flint Holdings, LLC, Hummelstown, PA (US)

( * ) Notice: Subject to any disclaimer, the term of this patent is extended or adjusted under 35 U.S.C. 154(b) by 339 days.

(21) Appl. No.: 16/020,845

(22) Filed: Jun. 27, 2018

(65) Prior Publication Data
US 2020/0000085 A1 Jan. 2, 2020

(51) Int. Cl.
*A01M 31/06* (2006.01)

(52) U.S. Cl.
CPC .................................. *A01M 31/06* (2013.01)

(58) Field of Classification Search
CPC ............................ A01M 31/025; A01M 31/06
See application file for complete search history.

(56) References Cited

U.S. PATENT DOCUMENTS

| | | | | |
|---|---|---|---|---|
| 4,590,699 A * | 5/1986 | Nicks | ..................... | A01M 31/06 43/2 |
| 5,051,293 A * | 9/1991 | Breitscheidel | .......... | B29C 53/06 428/157 |
| 5,660,220 A * | 8/1997 | Ruan | ...................... | B60J 1/2091 160/370.23 |
| D398,697 S * | 9/1998 | Scordo | ......................... | D22/125 |
| 6,289,968 B1 * | 9/2001 | Karten | ................... | B60J 1/2091 160/370.21 |
| 7,451,861 B2 * | 11/2008 | Bhavnani | ............. | A45C 7/0077 150/113 |
| 7,784,213 B1 * | 8/2010 | Primos | .................. | A01M 31/06 43/2 |
| 2005/0081422 A1 * | 4/2005 | Bradford | ............... | A01M 31/06 43/2 |
| 2008/0216381 A1 * | 9/2008 | Wyant | ................... | A01M 31/06 43/2 |
| 2011/0010982 A1 * | 1/2011 | Poorman | ............... | A01M 31/06 43/2 |
| 2012/0042561 A1 * | 2/2012 | Bain | ..................... | A01M 31/06 43/3 |
| 2012/0180297 A1 * | 7/2012 | Peterson | ................... | B44C 5/02 29/428 |
| 2012/0180371 A1 * | 7/2012 | Roe | ........................ | A01M 31/06 43/3 |
| 2014/0020726 A1 * | 1/2014 | Nolz | ....................... | F41A 23/14 135/144 |
| 2014/0130396 A1 * | 5/2014 | Yaron | ................... | A01M 31/06 43/2 |
| 2014/0245653 A1 * | 9/2014 | Foster | .................. | A01M 31/06 43/3 |
| 2015/0143735 A1 * | 5/2015 | Downard | ............... | A45B 11/00 43/2 |

(Continued)

*Primary Examiner* — Michael H Wang
(74) *Attorney, Agent, or Firm* — Messner Reeves LLP

(57) ABSTRACT

An animal decoy device is presented. The animal decoy device comprises a panel or panels with a realistic representation of a turkey tail fan imprinted thereon and a plurality of pockets located on a central area substantially on a lower portion of the decoy, wherein each pocket is configured to retain a quill of a feather.

14 Claims, 10 Drawing Sheets

(56) References Cited

U.S. PATENT DOCUMENTS

| | | | |
|---|---|---|---|
| 2015/0226373 A1* | 8/2015 | Powell | B44C 5/06 |
| | | | 248/205.1 |
| 2016/0198701 A1* | 7/2016 | Bartel | A01M 31/06 |
| | | | 43/2 |
| 2017/0176125 A1* | 6/2017 | Pauley | F41A 23/04 |
| 2019/0320647 A1* | 10/2019 | Peel | A01M 31/06 |

* cited by examiner

FOLDING FEATHER DECOY

FIELD OF THE INVENTION

The present invention relates to folding animal decoys configured to accept real feathers of the animal being decoyed, and that are easy to transport, set-up and use in the field due to their light weight and portability.

BACKGROUND

Animal decoys to attract animals may be used when hunting or nature watching. There are many different types of decoys, for example, full-bodied replicas of turkey, duck, or geese decoys are available on the market. Some full-bodied replica decoys include a mechanism to attach and display real feathers of the replicated bird, for example the tail fan of a turkey. However, these full-bodied replicas tend to be constructed of various hard foams and/or plastics and can be bulky and difficult to transport into the field. Additionally, the real feathers used in conjunction with these decoys are susceptible to being damaged when the decoy is being transported or stored as there is no protective means provided for the real feathers.

There are also two-dimensional expandable or folding decoys that show a photographic or realistic representation of an animal. These two-dimensional decoys are typically foldable and lightweight making them ideal for transporting into the field. However, two-dimensional decoys do not include a means for attaching real bird feathers to the decoy and a way of providing protection for the real feathers during transport and storage. Thus, there is an unfulfilled need for a two-dimensional decoy with a means provided for attaching real bird feathers which also provides protection for these real feathers while retaining the features that enable the decoy to be easily transported and set-up or broken down due to its light weight construction and foldability.

SUMMARY

Embodiments of the invention include a turkey decoy fan comprising a first layer of fabric material with a realistic representation of a front view of a turkey tail fan imprinted thereon and second layer of fabric material with a realistic representation of a back view of the turkey tail fan imprinted thereon. The first and second layers of fabric material are stitched together to form a plurality of pouches with at least two panels sandwiched between the first and second layers of fabric material where each of said panels is contained in its own pouch of the plurality of pouches. The decoy further comprises a plurality of pockets located on a central area substantially on a lower portion of the first layer of fabric material, wherein each pocket is configured to retain a quill of a feather. The plurality of pockets may be positioned to form a fan shape.

The decoy may also comprise a collapsible pole configured to extend across all of the panels, wherein opposite ends of the collapsible pole are secured to the second layer of fabric material at positions where the second layer covers the two outermost panels. The collapsible pole may further include a T-connector located at a mid-point of the collapsible pole wherein a post extends from the T-connector in a perpendicular direction from the collapsible pole.

The decoy may be configured such that the plurality of pouches includes four pouches, and the at least two panels includes four panels wherein each of the four panels is contained in its own pouch of the four pouches, and wherein the turkey decoy fan is configured to fold such that a front of each the two outermost panels folds onto a front of a neighboring innermost panel, and back sides of the two innermost panels fold together.

The decoy may further comprise a three-dimensional head formed to provide a realistic representation of a real turkey head and a textured fabric sheet configured to simulate the chest of a turkey.

In another embodiment, the decoy may comprise a flexible panel configured to mimic the shape of an extended turkey fan and a plurality of pockets located on a central area substantially on a lower portion of a first side of the flexible panel, wherein each pocket is configured to retain a quill of a feather.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
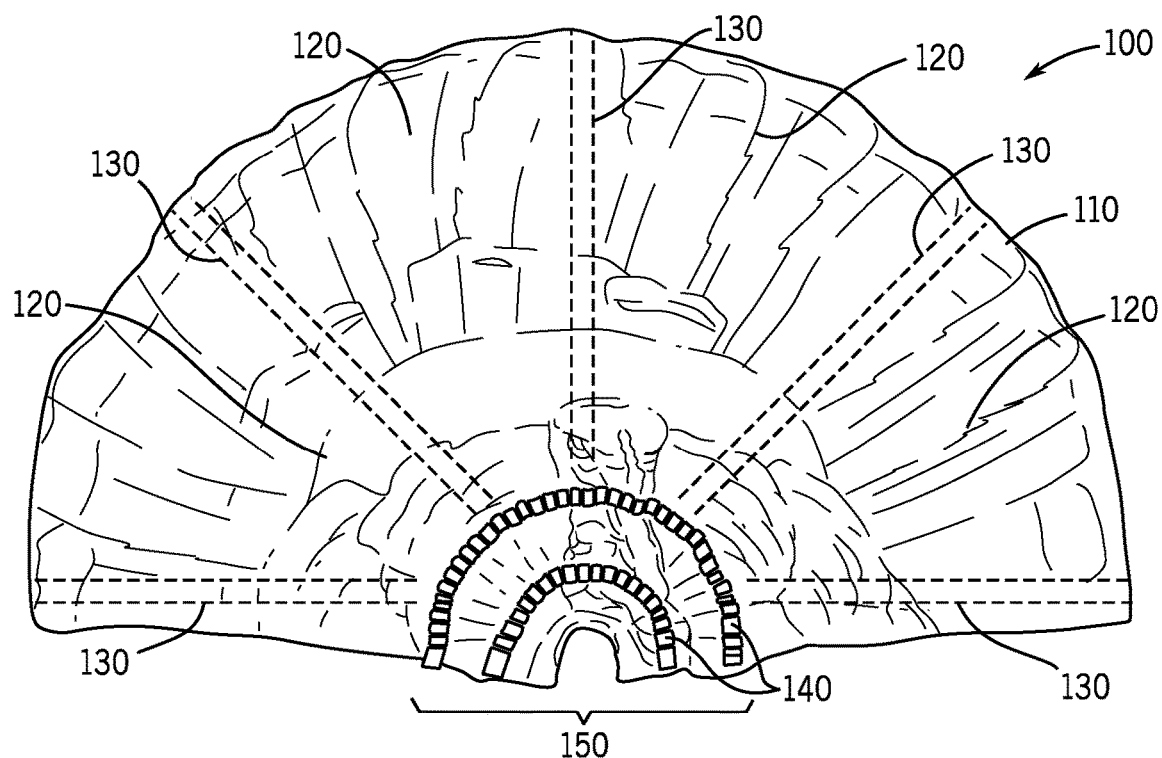
FIG. 1 is a front view of an animal decoy, according to an embodiment of the invention.

While hunting or animal watching, placing an animal decoy in an area may attract or entice the decoyed animal to come into that area. Often these outdoor activities take place in rural areas or far from hubs of human activity, so it may be necessary for participants to travel, sometimes by foot, for great distances to find a place to install or position a decoy. This creates a need for a decoy that can be easily transported, even in rough terrain. This may be particularly true if participants want to move a decoy to different areas while out in the field.

Additionally, attracting game birds may be done with a technique sometimes referred to as reaping. In this method of hunting, a decoy is manipulated by the hunter and used to attract a particular type of game bird. Instead of focusing on being concealed, for example in a blind, the hunter positions himself behind the decoy and uses the decoy to close the distance in order to get a good shot at the desired bird. In this type of hunting method, it is desirable to have the added realism that the incorporation of real bird feathers brings to a decoy.

The present invention is an animal decoy that may be easily compacted and secured for storage or transport, is relatively lightweight, and is easily deployed in the field while also having the ability to include real feathers representative of the type of animal being decoyed. In various embodiments described herein, a turkey decoy is described and used as a non-limiting example. In some embodiments, the decoy may be another type of bird, for example, a goose, a duck, or other type of game bird.

While the invention is susceptible to various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
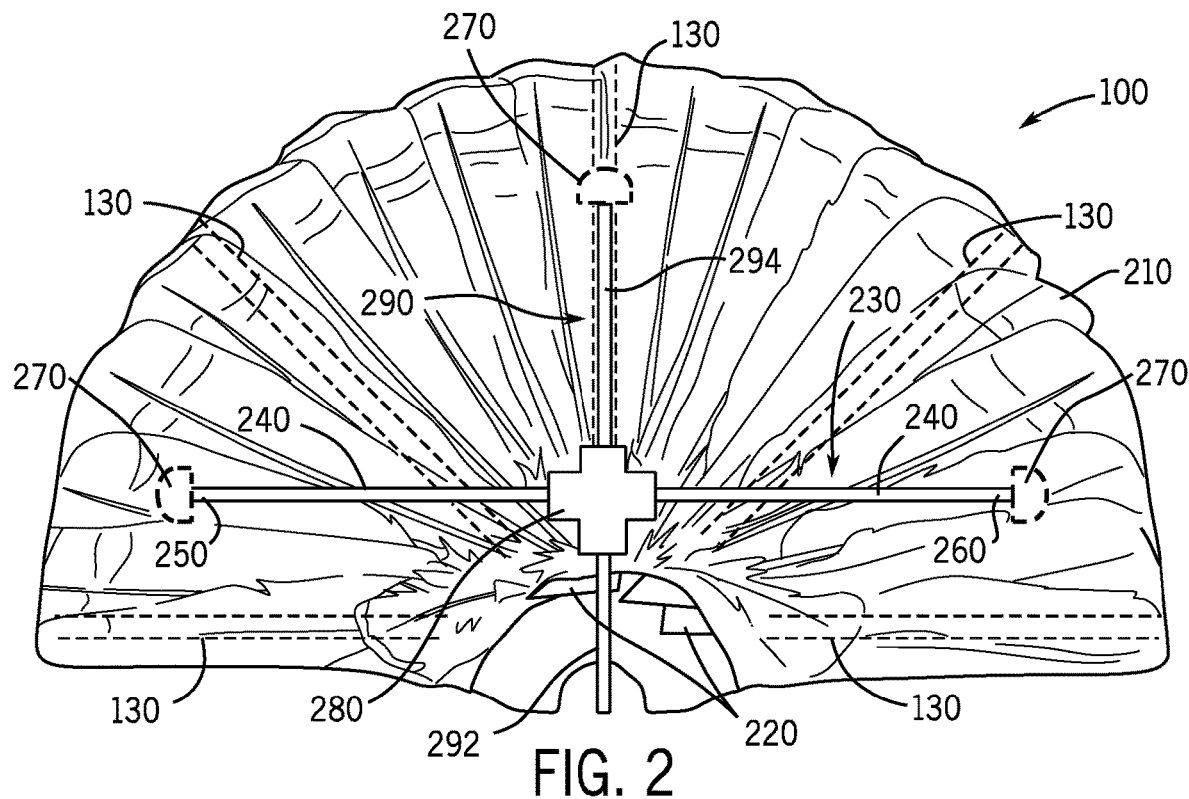
FIG. 2 is a back view of the animal decoy shown in FIG. 1.

Referring to FIGS. 1, 2, and 3, several views of an embodiment of the present decoy system are illustrated. FIG. 1 shows a two-dimensional turkey decoy 100 which comprises a first layer of fabric material 110 imprinted with a realistic representation of a front view of a turkey, including a prominent view of the turkey's tail fan. Embodiment 100 further comprises a second layer of fabric material 210, as shown in FIG. 2. The second layer of fabric material 210 may be imprinted with a realistic representation of a back view of the turkey. The two layers of fabric 110, 210 that make up the decoy 100 can be a fabric such as polyester, cotton, nylon, or any number of woven fabrics. The fabric is printed to resemble the color, texture, feathers, and other visual features that would be expected to create a realistic image of an animal. Although embodiment 100 is described as showing an image of a turkey on its outer surfaces, it should be understood, that alternative images could be used, for example, a camouflage imprint could be used, or no imprint may be desired at all. Further, the material used for the first and second layers 110, 210 may be a weather resistant material that still readily accepts the printing process.

Figure 3A:
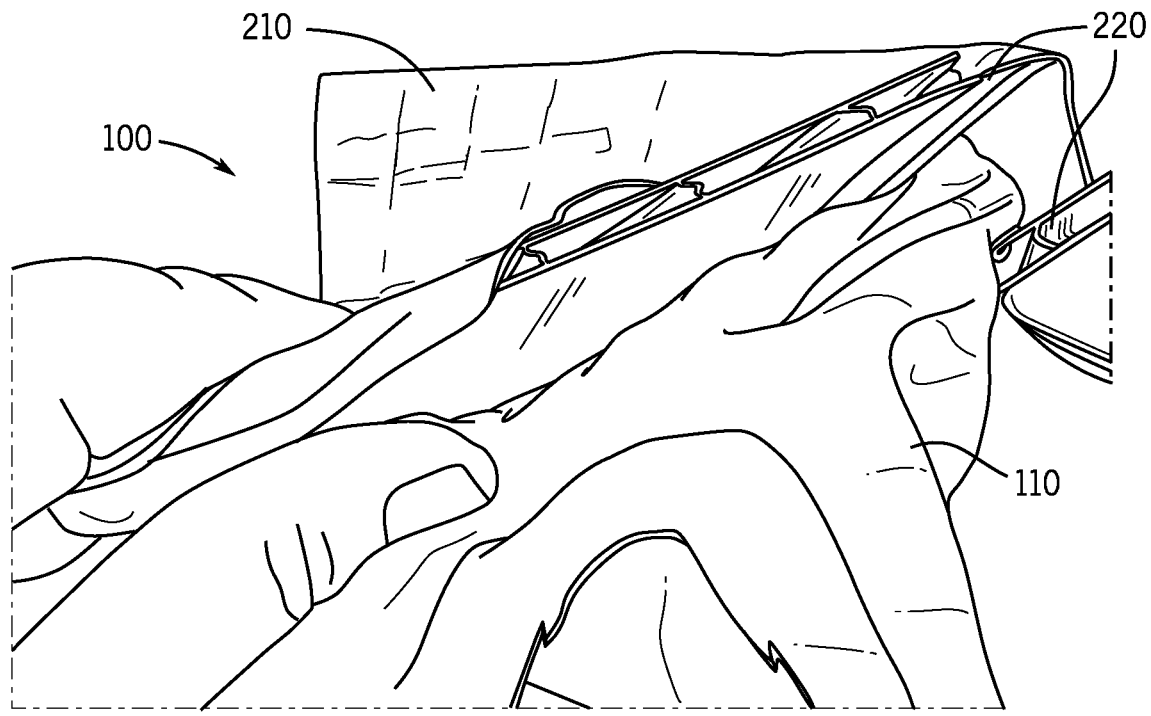
FIG. 3a is a partial internal view of the animal decoy shown in FIG. 1.
Figure 3B:
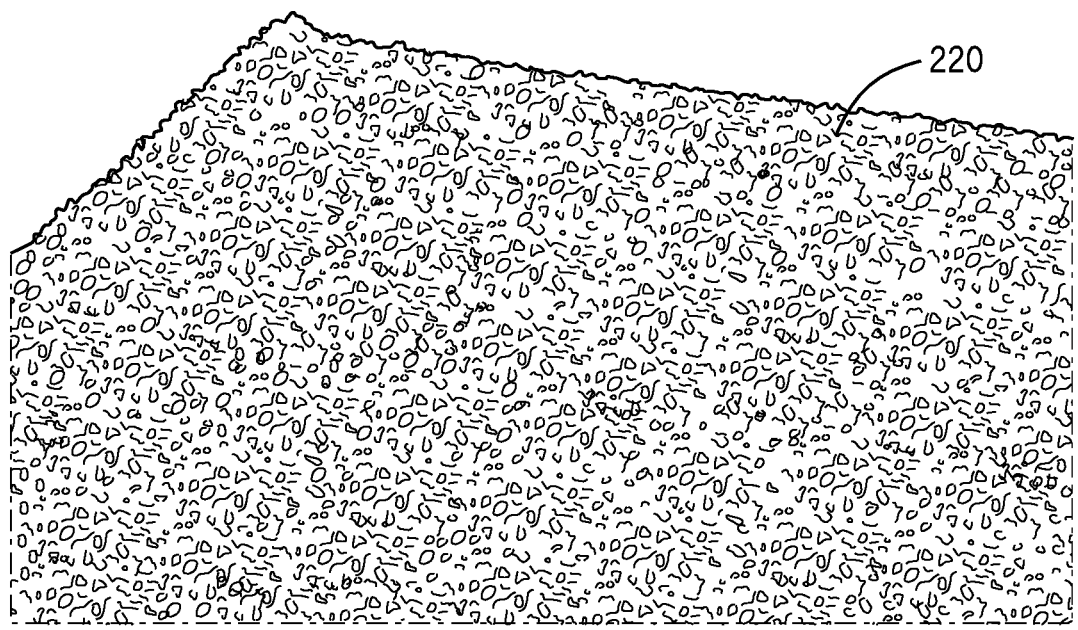
FIG. 3b is a partial exposed view of an internal panel according to an embodiment of the invention.
Figure 3C:
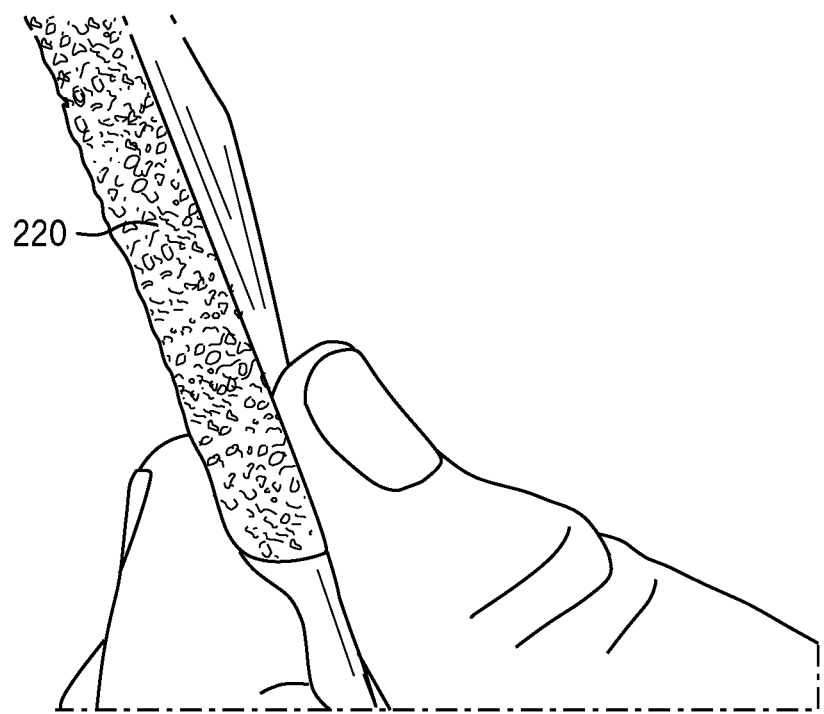
FIG. 3c is a side view of the internal panel shown in FIG. 3b.

The first and second layers 110, 210 may be formed of two separate pieces of material and fastened together, or alternatively, may be formed of one piece of material and folded together at some connection point. In either case, the first and second layers 110, 210 are connected together, for example, sewn, to form an enclosed space between the two layers. This enclosed space may be divided into separate pouches 120 defined by stitching lines 130. Referring to FIGS. 2, 3*a*, 3*b*, and 3*c*, a rigid or semi-rigid panel 220 may be included inside each separate pouch 120. In the view shown in FIG. 2, only the triangular shaped tips of two of the panels 220 are visible. In embodiment 100 the pie-slice shaped panels 220 extend substantially throughout its corresponding pouch 120, and are sufficiently rigid that the decoy 100 remains upright, and does not fold when in use. The panels 220 may be formed of any suitable material that provides the desired rigidity and resilience to the elements. As a non-limiting example, the panels 220 may be formed of corrugated plastic sheets, as shown in FIG. 3*a*. As another non-limiting example, the panels 220 may be formed of a high-density foam that is waterproof and both flexible yet rigid enough that it will return to its original shape after being manipulated. An approximately ½ inch thick polyethylene foam sheet, as shown in FIGS. 3*b* and 3*c*, satisfies these requirements. This type of panel also includes the added benefit of providing a cushioned environment in which to protect the real feathers 410 during transportation or storage when the decoy 100 is in its folded state, as described in more detail below.

In the embodiment of decoy 100, four panels 220 are used, but any number of panels could be used to provide the desired foldability of the decoy. Further, a single flexible panel, configured to mimic the shape of an extended turkey fan may be used in place of the individual panels 220. In such an embodiment, the single flexible panel may have scored lines that aid in folding the flexible panel and may have retaining loops 140 attached directly to its front surface. The retaining loops 140 are described in greater detail below. Additionally, the front and back sides of the single flexible panel may be imprinted directly with a realistic representation of a front and back view of a turkey fan in an extended position.

Figure 4A:
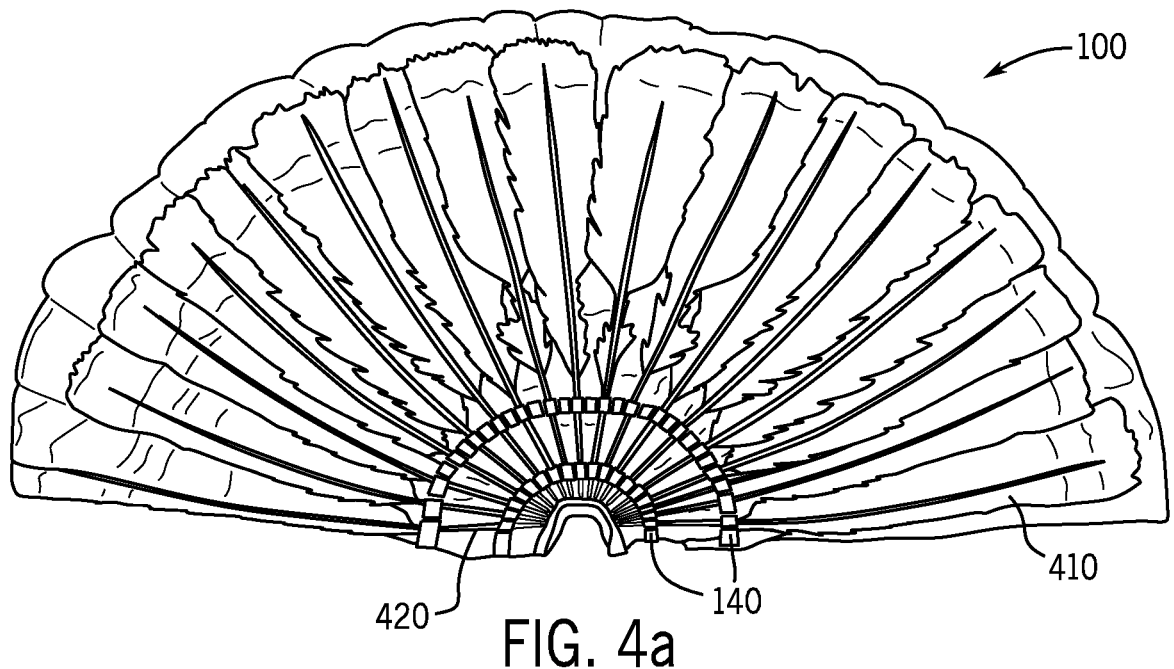
FIG. 4a is a front view of the animal decoy shown in FIG. 1 with real feathers attached.
Figure 4B:
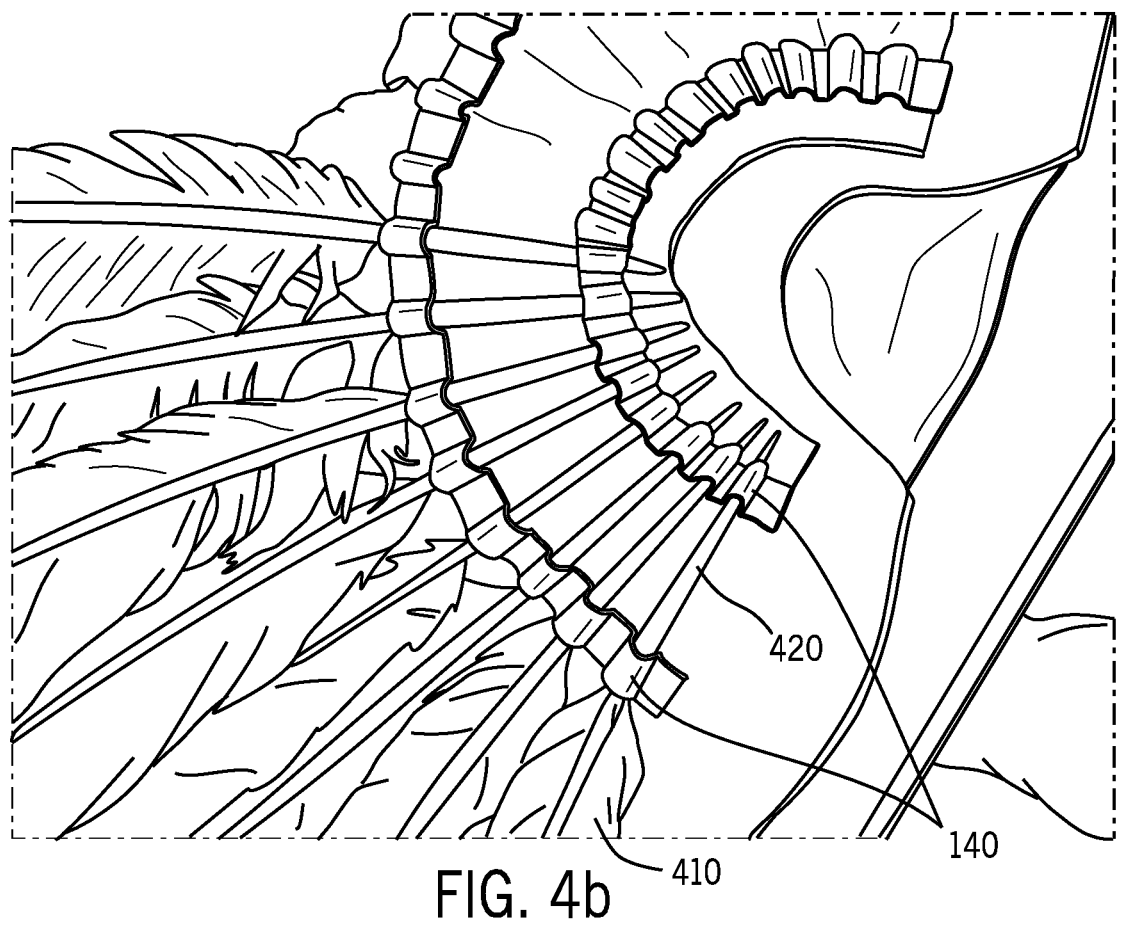
FIG. 4b is a view of the feather retaining system, according to an embodiment of the invention.

The stitching lines 130 may be configured to provide some fabric spacing between the panel pouches 120. This spacing provides a flexible connection between the enclosed panels 220, which allows the enclosed panels 220 to be folded together to decrease the size of the decoy 100, as shown in FIGS. 6-9. This folded configuration also acts to protect, during transportation or storage, the real feathers 410 that may be incorporated into the decoy 100. A plurality of retaining loops 140, which may be attached to a central area 150 situated substantially on a lower portion of the first layer of fabric material 110, are configured to retain a quill 420 of real feather 410, as shown in FIGS. 4*a* and 4*b*. The retaining loops 140 may be formed from any suitable material such as polyester, cotton, nylon, or any number of woven fabrics, including fabrics that incorporate an elastic capability. For example, the retaining loops 140 shown in the decoy 100 are constructed from elastic webbing or straps which are sewn in place to form two rows of loops. These retaining loops 140 stretch to conform to different sized feather quills 420, thereby providing a snug and secure hold on feathers of various shapes and sizes. The retaining loops 140 are also constructed such that replacing a damaged feather is as simple as pulling a feather 410 out of its retaining loops 140 and inserting a new undamaged feather.

Figure 5A:
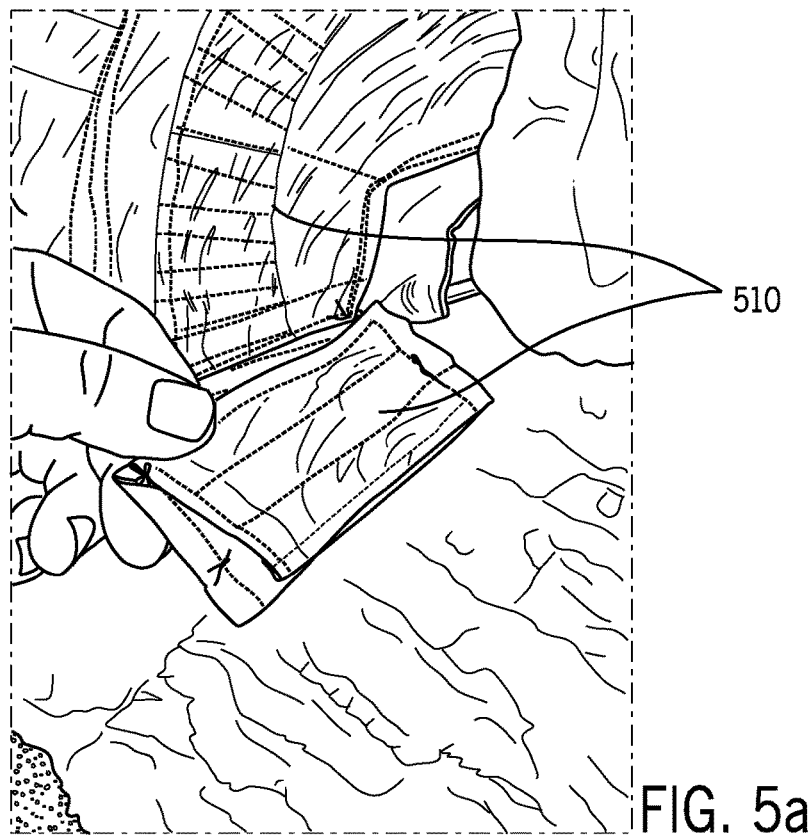
FIG. 5a is a view of an alternative feather retaining system, according to an embodiment of the invention.
Figure 5B:
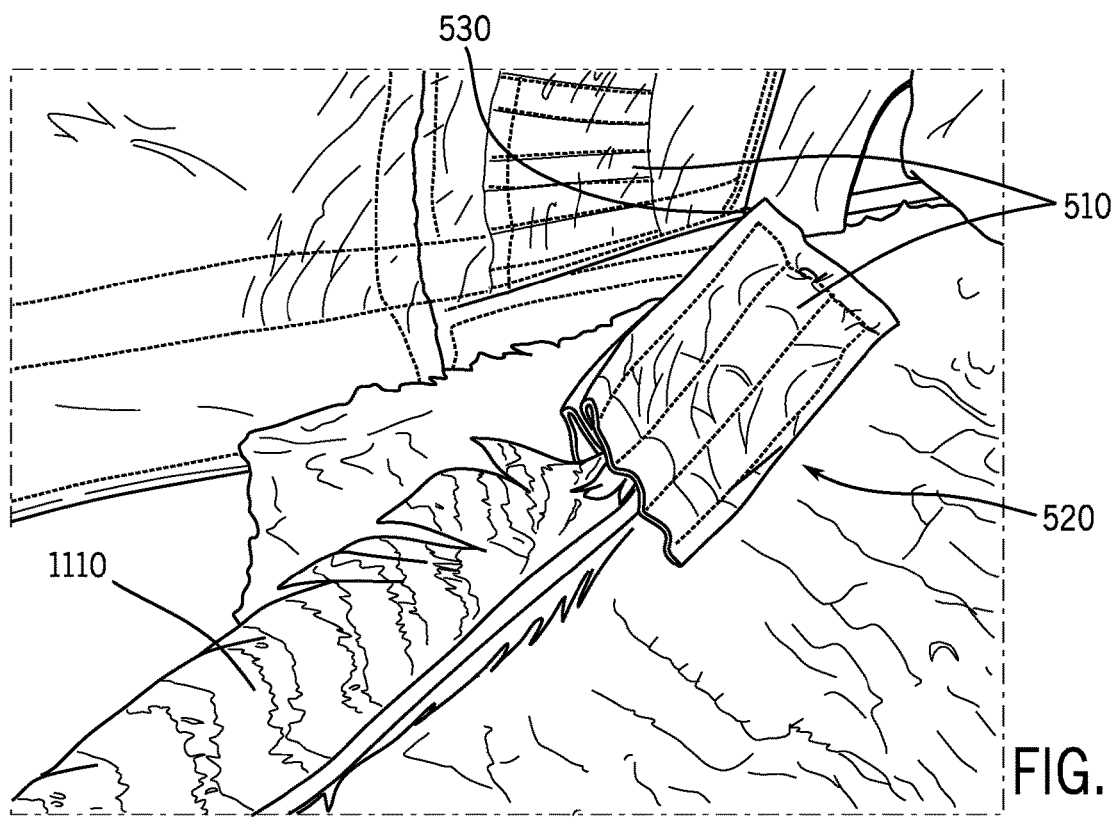
FIG. 5b is a view of the alternative feather retaining system with a wing feather inserted.
Figure 7:
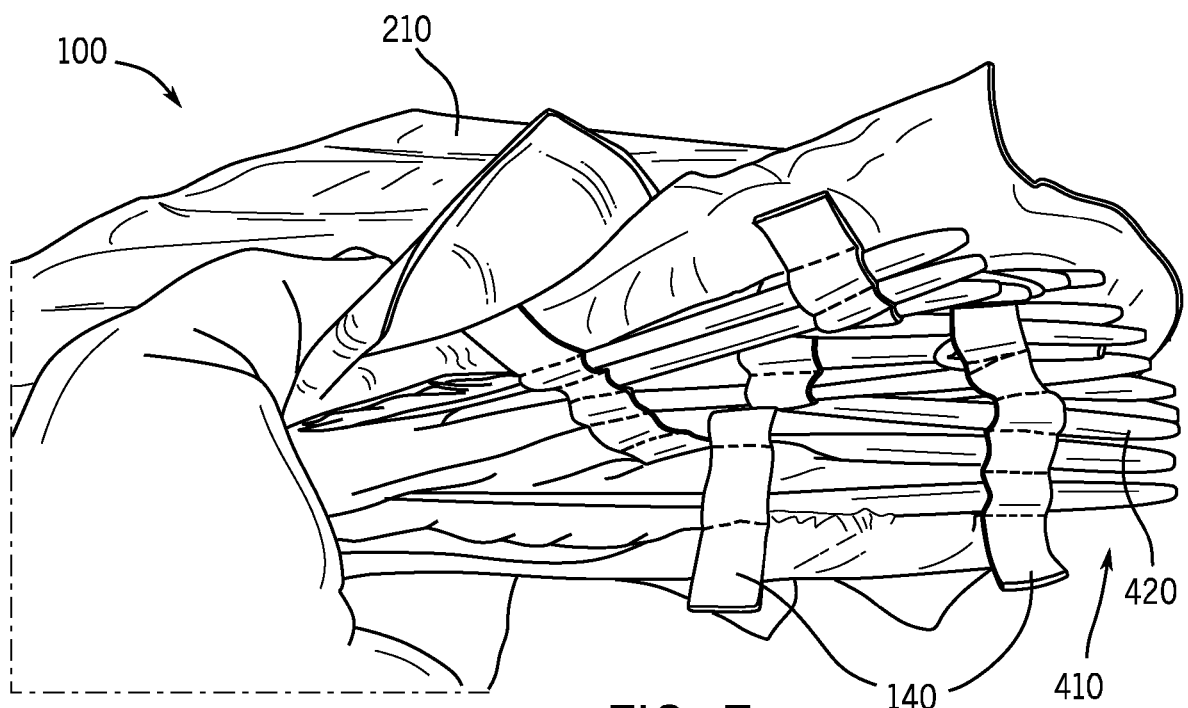
FIG. 7 is a side view of the animal decoy of FIG. 1 in a folded configuration.

In another embodiment, the feathers may be retained in a plurality of narrow fabric pockets 510, as shown in FIGS. 5*a* and 5*b*. The pockets 510 are located in the central area 150 in a general fan-shaped configuration and act in much the same manner as the previously described retaining loops 140, in that they provide a snug and secure hold on the quill 420 of feathers of various shapes and sizes, and yet, still provide for easy removal and replacement in the event the real feathers 410 are damaged.

Referring to FIGS. 4*a*-5*b*, the decoy 100 is shown with feathers 410 inserted into the retaining loops 140 or pockets 510. As can be seen in FIG. 4*a*, the printed representation of the front view of a turkey shown on the first layer of fabric material 110 acts to fill in any voids or imperfections exhibited by the layer of feathers 410. In the embodiment of FIG. 4a the configuration of retaining loops 140 form two semi-circular concentric lines, so that each of the feather quills 420 may be inserted into two retaining loops 140. In the embodiment shown in FIG. 5a the pockets 510 are positioned in a fan shape so that the feathers quills 420 are inserted in the respective pockets 510, such that the feathers 410 mimic the shape of a tail fan.

The retaining loops 140 may be constructed in any suitable form such that the feathers 410 are sufficiently secured in place. As a non-limiting example the retaining loops 140 may be shaped as tubular attachments that accept an inserted quill 420. Or, the retaining loops 140 may be more clip-like in design, such that they do not form a fully enclosed circle around each quill 420. Similarly, the configuration of the retaining loops 140 may be in any shape that allows the feathers 410 to be displayed in a fan shape. For example, two concentric rectangular shaped lines with angled loops would also provide the desired fan display of the inserted feathers 410.

Similarly the pockets 510 may be constructed of any suitable material, but as shown in the embodiment of FIGS. 5a and 5b, the material used may be the same as the fabric used for the rest of the decoy and includes the same photo print, which acts to enhance the overall realism of the decoy 100.

Figure 6:
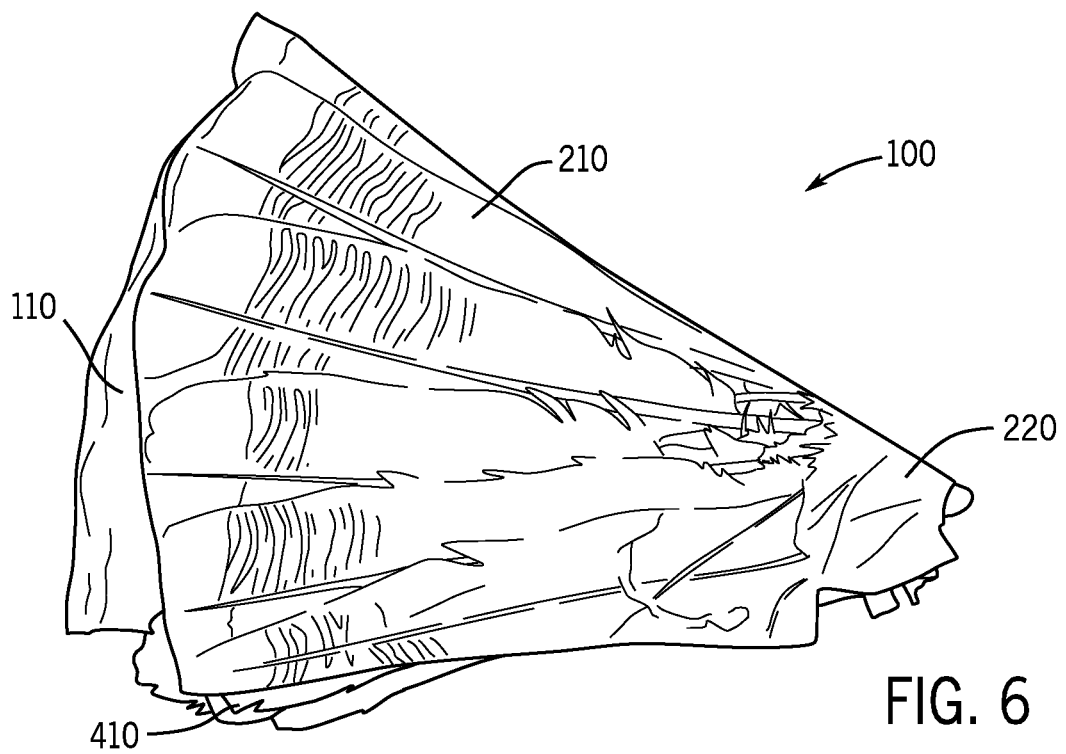
FIG. 6 is the animal decoy of FIG. 1 in a folded configuration.
Figure 8:
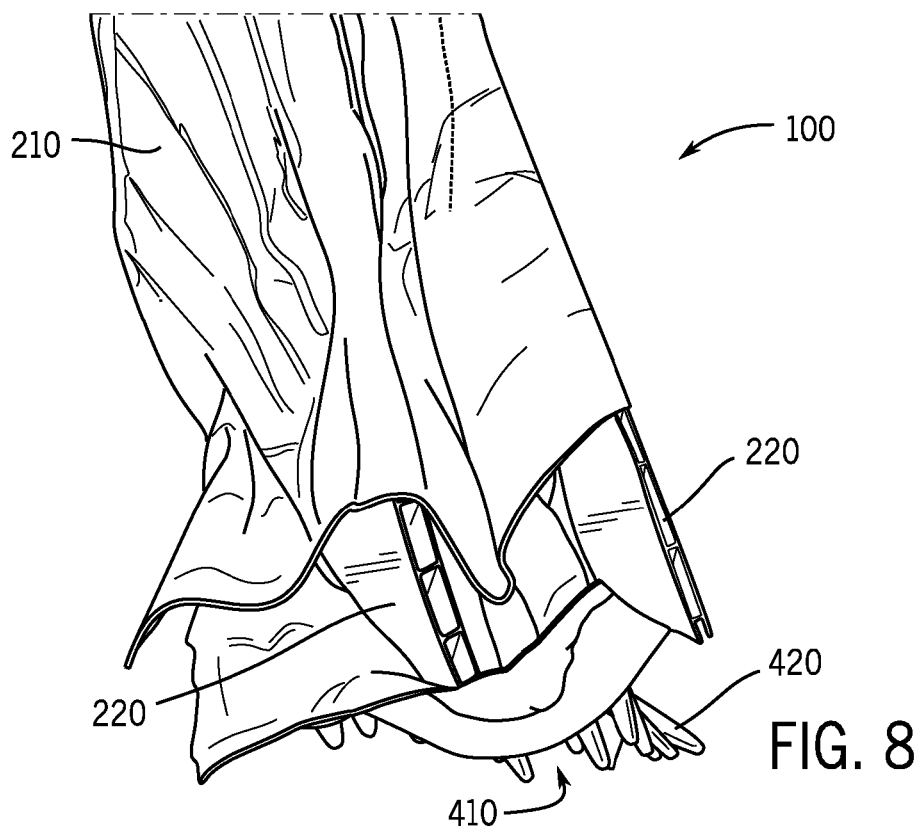
FIG. 8 is a partial internal side view of the animal decoy of FIG. 1 in a folded configuration.
Figure 9:
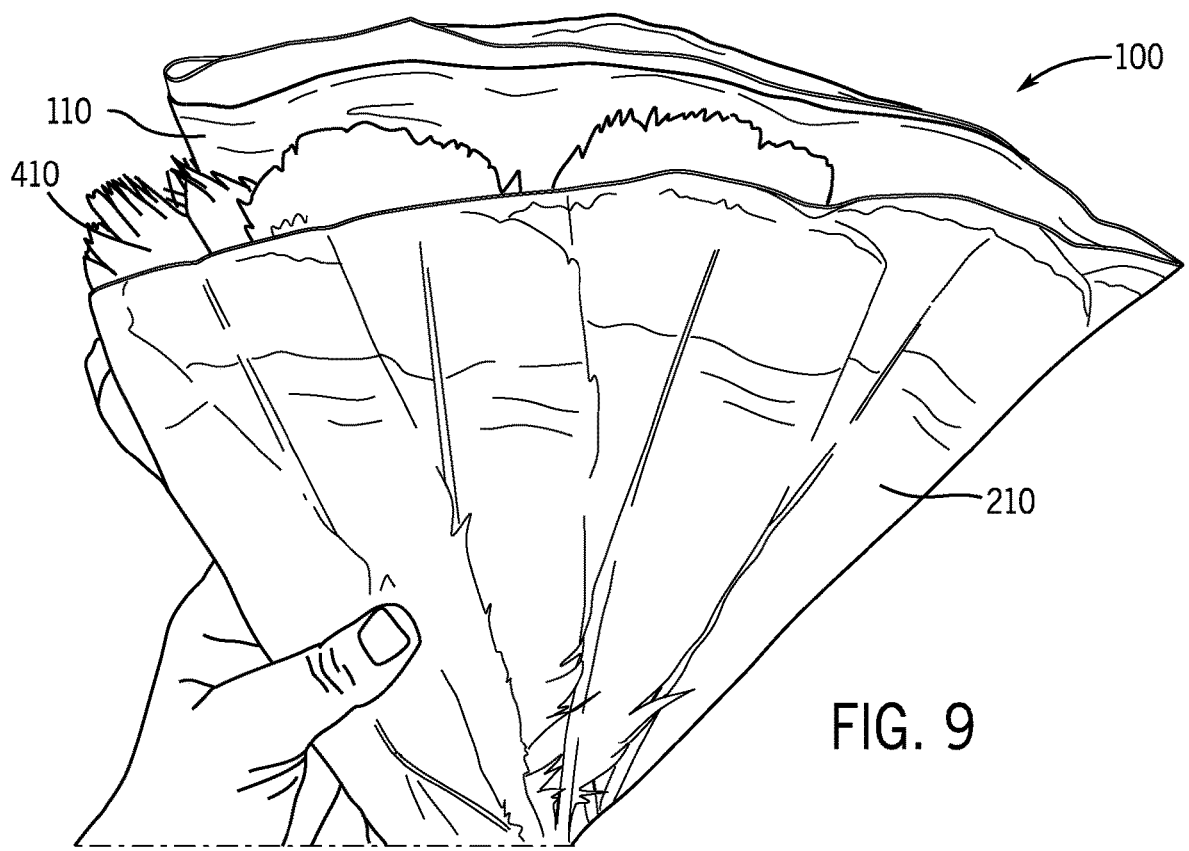
FIG. 9 is a perspective top view of the animal decoy of FIG. 1 in a folded configuration.

Referring to FIGS. 6, 7, 8, and 9, the foldability of the decoy 100 is shown. FIG. 6 shows a view of the decoy 100 in a folded position, where a portion of the second layer of fabric material 210 is visible. Only the top edges of both the plurality of feathers 410 and the first layer 110 are visible as the decoy 100 is folded in a manner to cover the real feathers 410 for protection during transport and storage. Where the decoy 100 has four panels 220, the method of folding includes folding the two outermost panels onto the next closest panels such that the attached feathers 410 are positioned facing each other. The back side of the two innermost panels 220 are then folded together, as shown in FIG. 8. This method of folding ensures that the attached feathers 410 are covered and protected when the decoy 100 is in the folded position.

When decoy 100 is in the extended position, as shown in FIGS. 1, 2, and 4, a collapsible pole 230 may serve as a means to keep decoy 100 in its extended position. Collapsible pole 230 may comprise a plurality of members 240 which are shock-corded together in the same fashion as a collapsible tent pole. Collapsible pole 230 extends across all of the panels 220 and its opposite ends 250, 260 are secured to the second layer of fabric material 210 at positions where the second layer 210 covers the two outermost panels 220. Opposite ends 250, 260 may be secured to the second layer 210 by inserting the ends 250, 260 into small tabs or pouches 270 formed on the second layer 210. Alternatively, or additionally, hook and loop (Velcro) fasteners, or any suitable means, may be used to secure the collapsible pole 230. Similarly, it should also be understood that a variety of other means could be used to maintain the decoy 100 in the extended position, including almost any suitably sized rigid member.

The collapsible pole 230 may include a T-connector 280 at its mid-point, to which a post 290 is connected via shock cord. The post 290 extends from the T-connector 280 perpendicular to the collapsible pole 230. The post 290 may comprise a plurality of members 292, 294 which are shock-corded together in the same fashion as a collapsible tent pole 230. The lower member 292 may be used as a stake to allow the user to position the decoy 100 in the ground, in which case the tip of lower member 292 may have an angled or pointed end to help the user insert it into the ground. Alternative, or additionally, the lower member 292 may be used as a handle to be grasped by the user during a reaping style of hunting. The upper member 294 serves as a means to add rigidity to decoy 100 when in its extended position. Similar to the ends 250, 260 of the collapsible pole 230, the top end of the upper member 294 may be inserted into pouch 270 for securing purposes.

Alternatively the collapsible pole 230 and post 290 may be located internally within the previously described first and second layers 110, 210 of decoy 100. In this embodiment, the T-connector 280 may be positioned in a cut-out space so that the collapsible pole 230 and post 290 can be disassembled as described above.

Figure 10:
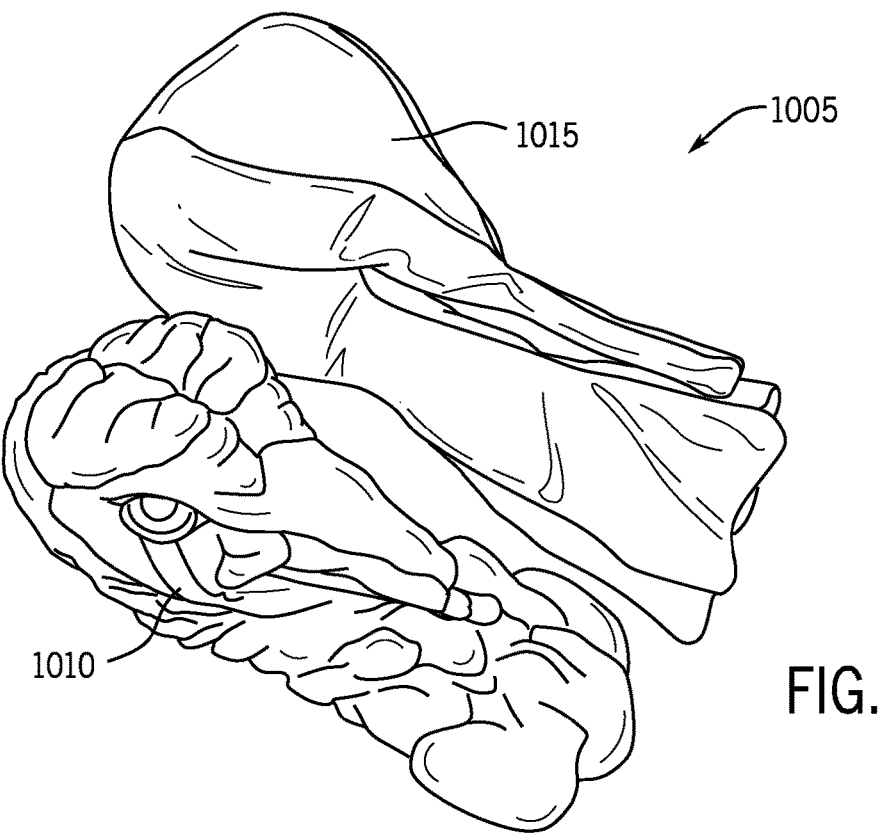
FIG. 10 is a front view of a 3-Dimensional head, according to an embodiment of the invention.
Figure 11:
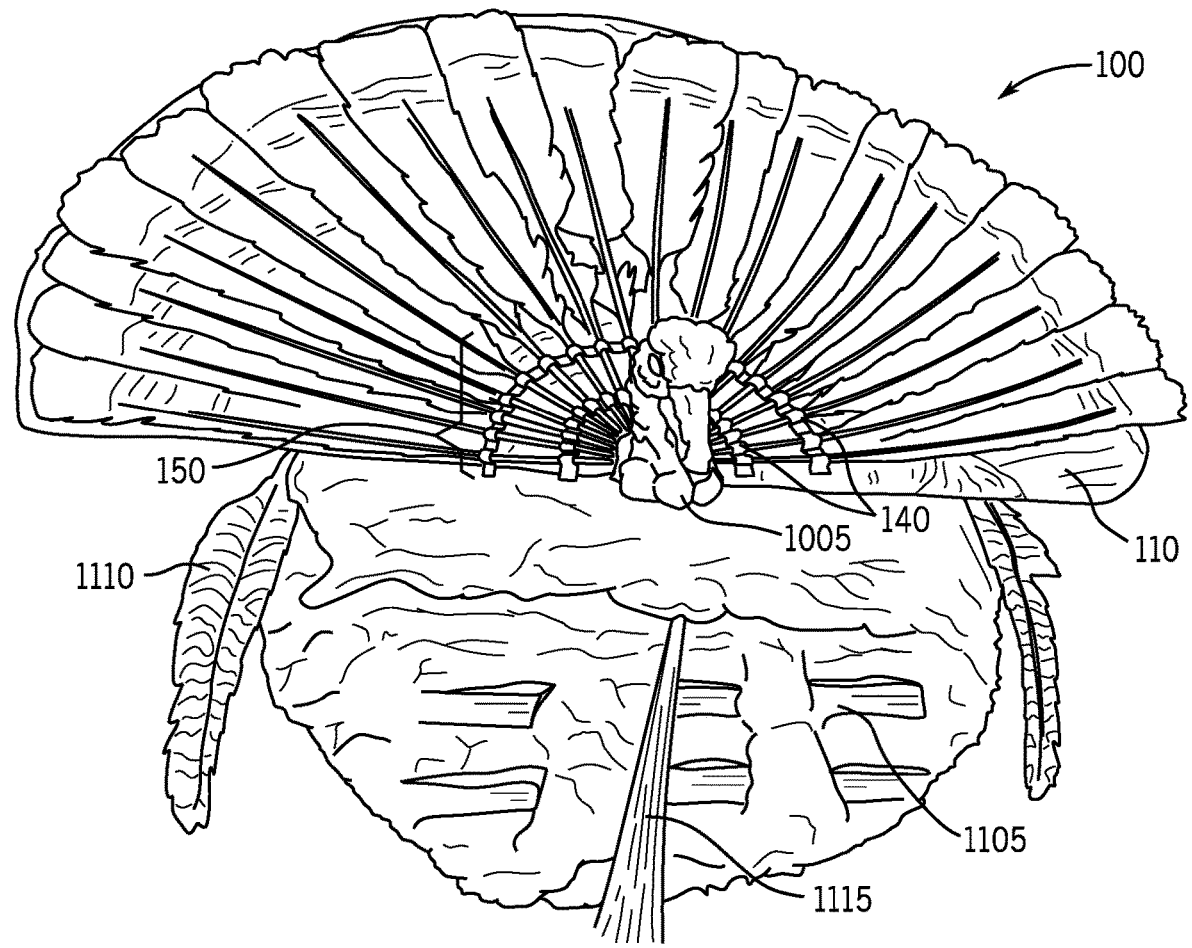
FIG. 11 is a front view of the animal decoy shown in FIG. 1 incorporating the use of real feathers and the 3-Dimensional head.

Referring to FIGS. 10 and 11, the decoy 100 may also comprise a three-dimensional head 1005. The three-dimensional head 1005 may be formed from a molded plastic, as shown by turkey head 1010, in which case the molded form is painted to provide a realistic representation of a real turkey head. Alternatively, the three-dimensional head 1005 may be constructed from a fabric material and stuffed with a filler to expand the head into a three-dimensional shape, as shown by turkey head 1015. In the case of the head constructed from material 1015, the material used may be imprinted with a realistic representation of a turkey head.

The three-dimensional head 1005 may be removably or permanently connected to the decoy 100 at a point near or proximate to the central area 150 which is situated substantially on a lower portion of the first layer of fabric material 110, and where the plurality of retaining loops 140 may be attached to first layer 110, as shown in FIG. 11. FIG. 11 also illustrates some additional optional features of the decoy 100. A textured fabric sheet 1105 may be used to simulate the chest or body of the turkey, which also provides more coverage for a hunter using the decoy 100 as a reaping style decoy. The textured sheet 1105 may be attached to the bottom edge of the decoy 100 through any suitable means including hook and loop (Velcro) fasteners, buttons, ties, etc. The textured sheet 1105 may also include some wing feathers 1110 and a beard 1115 to increase realism. The wing feathers 1110 may have their own pockets 510 which are located on a hanging appendage 520 that is hingedly connected to the main body of the decoy 100 at point 530, as shown in FIG. 5b. This hinged connection allows the wing feathers to be tucked into the decoy 100 with the rest of the real feathers 410 when the decoy 100 is in the folded position, thus providing protection for the wing feathers 1110 during storage and transport.

Figure 12:
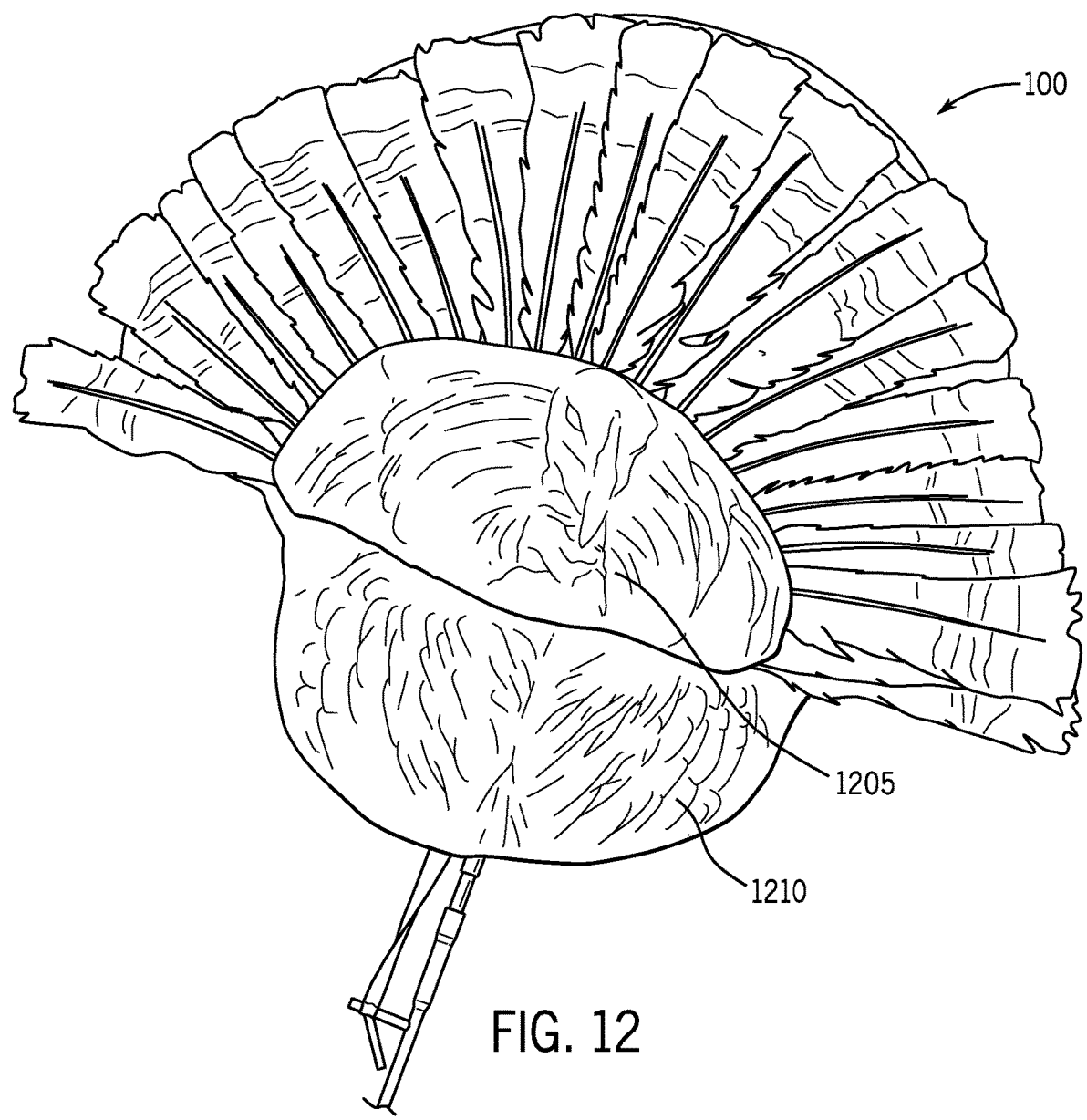
FIG. 12 is a front view of an animal decoy, according to another embodiment of the invention.

Referring to FIG. 12, in place of a three-dimensional head, decoy 100 may comprise a two-dimensional representation of a head 1205. The two-dimensional representation 1205 may include a representation of body feathers which help to cover the plurality of retaining loops 140, and may be constructed of a weather resistant material that is imprinted with the image of the turkey head and body feathers. Similarly, in place of the textured fabric sheet mimicking the chest or body of the turkey, a two-dimensional representation of a chest 1210 may be used.

Figure 13:
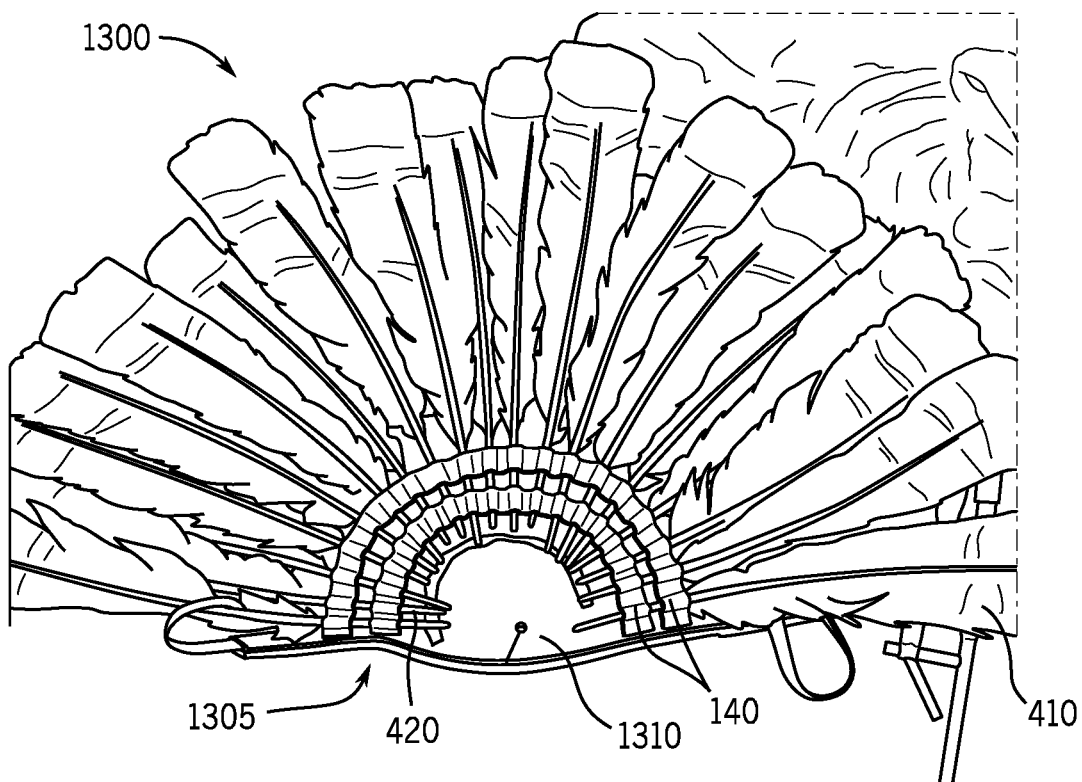
FIG. 13 is a back view of an animal decoy according to another embodiment of the invention.
Figure 14:
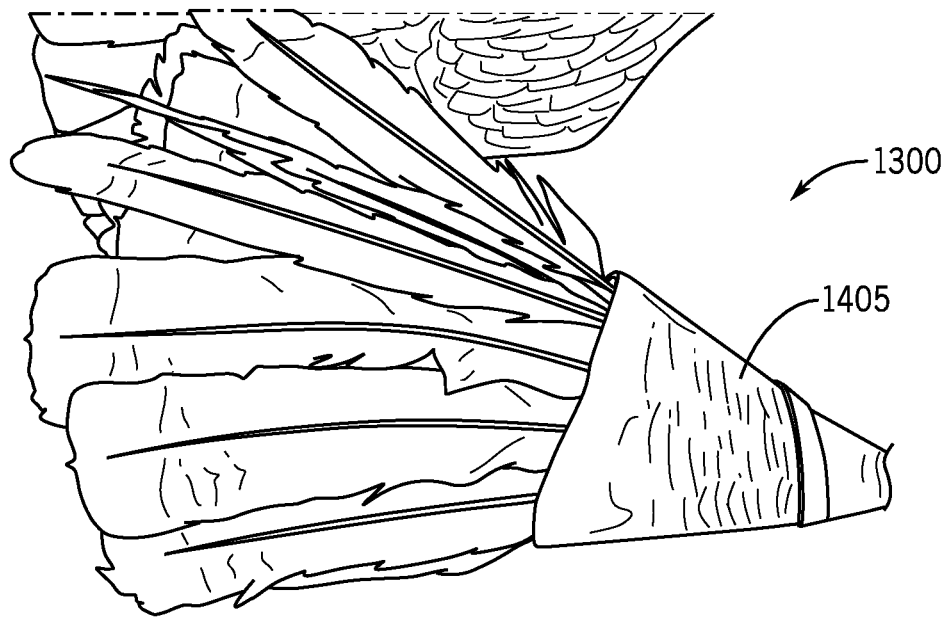
FIG. 14 is a front view of the animal decoy of FIG. 13 in a rolled configuration.

An alternative embodiment of the invention is shown in FIGS. 13 and 14. Decoy 1300 comprises a flexible panel 1305 which may include an imprint showing a representation of a head and body feathers on its front side 1405, similar to the two-dimensional representation 1205. However, the back side 1310 of the flexible panel 1305 includes a plurality of retaining loops 140, which are configured to retain a quill 420 of real feather 410, as previously described with reference to FIG. 4. FIG. 14 shows the decoy 1300 in a rolled configuration which decreases the size of the decoy 1300 for transportation and storage purposes. The flexible panel 1305 is constructed of a material that provides enough rigidity to display the feathers 410 when the decoy 1300 is in the un-rolled configuration, yet is flexible enough to be curled and rolled into a cone shape as shown in FIG. 14. The material used for the flexible panel 1305 may be a thin sheet of semi-rigid plastic which is covered with fabric material that can receive the previously described imprint of likeness of the decoyed animal.

Although the example embodiments described herein describe a turkey decoy, the animal decoy could be almost any bird. For example the animal decoy could be a goose, a duck, etc. One skilled in the art will realize that a virtually unlimited number of variations to the above descriptions are possible, and that the examples and the accompanying figures are merely to illustrate one or more examples of implementations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments or implementations disclosed, but that such claimed subject matter may also include all embodiments or implementations falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment," "an embodiment," "one implementation," or "an implementation" may mean that a particular feature, structure, or characteristic described in connection with a particular embodiment or implementation may be included in at least one embodiment or implementation of claimed subject matter. Thus, appearances of the phrase "in one embodiment," "an embodiment," "one implementation," or "an implementation" in various places throughout this specification are not necessarily intended to refer to the same embodiment or implementation, or to any one particular embodiment or implementation described. Furthermore, it is to be understood that particular features, structures, or characteristics described may be combined in various ways in one or more embodiments or implementations. In general, of course, these and other issues may vary with the particular context of usage. Therefore, the particular context of the description or the usage of these terms may provide helpful guidance regarding inferences to be drawn for that context.

What is claimed is:

1. A turkey decoy fan comprising:
   a first layer of fabric material with a realistic representation of a front view of a turkey tail fan imprinted thereon;
   a second layer of fabric material with a realistic representation of a back view of the turkey tail fan imprinted thereon, and wherein the first and second layers of fabric material are stitched together to provide a plurality of stitching lines between the first and second layers of fabric material, wherein the plurality of stitching lines are configured to define a plurality of pouches and at least one fabric spacing therebetween and each pouch in the plurality of pouches is in an enclosed space between the first layer of fabric material and the second layer of fabric material;
   at least two panels sandwiched between the first and second layers of fabric material, wherein each of the panels is contained in its own pouch of the plurality of pouches and the at least two panels include a high-density foam material; and
   a plurality of pockets attached to a lower portion of the first layer of fabric material of the turkey decoy fan, wherein each pocket is configured to retain a quill of a feather and at least two pockets of the plurality of pockets are attached to a surface of each pouch in the plurality of pouches.

2. The turkey decoy fan of claim 1, wherein the plurality of pockets are positioned to form a fan shape.

3. The turkey decoy fan of claim 1, further comprising:
   a first tab coupled to the second layer of fabric material at a first position where the second layer of fabric material covers a first outermost panel of the plurality of panels;
   a second tab coupled to the second layer of fabric material at a second position where the second layer of fabric material covers a second outermost panel of the plurality of panels; and
   a collapsible pole configured to extend across all of the panels, wherein opposite ends of the collapsible pole are secured to the first tab and the second tab.

4. The turkey decoy fan of claim 3, wherein the collapsible pole further comprises a T-connector located at a mid-point of the collapsible pole, and wherein a post extends from the T-connector in a perpendicular direction from the collapsible pole.

5. The turkey decoy fan of claim 1, wherein the plurality of pouches includes four pouches, and the at least two panels includes four panels wherein each of the four panels is contained in its own pouch of the four pouches, and wherein the turkey decoy fan is configured to fold such that a front of each the two outermost panels folds onto a front of a neighboring innermost panel, and back sides of the two innermost panels fold together.

6. The turkey decoy fan of claim 1, further comprising:
   a three-dimensional head formed to provide a realistic representation of a real turkey head.

7. The turkey decoy fan of claim 6, further comprising:
   a textured fabric sheet configured to simulate the chest of a turkey.

8. A decoy comprising:
   a first layer of fabric material;
   a second layer of fabric material wherein the first and second layers of fabric material are connected together to form four individual pouches and to provide at least one fabric spacing portion therebetween, wherein the at least one fabric spacing portion is located between a plurality of connection points along the decoy that define where, along the first layer of fabric material, the second layer of fabric material connects when forming the four individual pouches and the four individual pouches are in an enclosed space between the first layer of fabric material and the second layer of fabric material;

four panels sandwiched between the first and second layers of fabric material, wherein each of the panels is contained in a corresponding one of the four individual pouches; and a plurality of pockets located on a central area substantially on a lower portion of the decoy, wherein each pocket is configured to retain a quill of a feather and at least two pockets of the plurality of pockets are attached to a surface of each enclosed pouch in the plurality of pouches.

9. The decoy of claim 8, wherein the first layer of fabric material is imprinted with a realistic representation of a front view of a turkey tail fan, and the second layer of fabric material is imprinted with a realistic representation of a back view of the turkey tail fan.

10. The decoy of claim 8, further comprising:

a first tab coupled to the second layer of fabric material at a first position where the second layer of fabric material covers a first outermost panel of the plurality of panels;

a second tab coupled to the second layer of fabric material at a second position where the second layer of fabric material covers a second outermost panel of the plurality of panels; and a collapsible pole configured to extend across all of the panels, wherein opposite ends of the collapsible pole are secured to the first tab and the second tab.

11. The decoy of claim 10, wherein the collapsible pole further comprises a T-connector located at a mid-point of the collapsible pole, and wherein a post extends from the T-connector in a perpendicular direction from the collapsible pole.

12. The decoy of claim 8, wherein the decoy is configured to fold such that a front of each the two outermost panels folds onto a front of a neighboring innermost panel, and back sides of the two innermost panels fold together.

13. The decoy of claim 8, wherein the first and second layers of fabric material are connected together via a plurality of stitches, wherein the plurality of stitches connecting the first and second layers of fabric material together are further configured to form the four individual pouches in a plurality of spaced locations between the first and second layers of fabric material, and wherein the plurality of stitches are further configured to provide the at least one fabric spacing portion.

14. The decoy of claim 8, wherein the at least one fabric spacing portion comprises an enclosed space that forms between the four individual pouches and between the first and second layers of fabric material at a time when the first and second layers of fabric material are connected together.

* * * * *